United States Patent
Ferrier et al.

(10) Patent No.: US 12,075,783 B2
(45) Date of Patent: Sep. 3, 2024

(54) PROCESS FOR PREPARATION OF COPPER COMPOUNDS

(71) Applicant: UPL LTD, Haldia (IN)

(72) Inventors: Frederic Ferrier, Marseilles (FR); Philippe Cavasse, Lons (FR); Marc Pillot, Vitrolles (FR)

(73) Assignee: UPL LTD, Mumbai (IN)

( * ) Notice: Subject to any disclaimer, the term of this patent is extended or adjusted under 35 U.S.C. 154(b) by 213 days.

(21) Appl. No.: 17/430,809

(22) PCT Filed: Mar. 15, 2019

(86) PCT No.: PCT/IB2019/052123
§ 371 (c)(1),
(2) Date: Aug. 13, 2021

(87) PCT Pub. No.: WO2020/170011
PCT Pub. Date: Aug. 27, 2020

(65) Prior Publication Data
US 2022/0159964 A1    May 26, 2022

(30) Foreign Application Priority Data
Feb. 19, 2019  (FR) ..................... 19/01654

(51) Int. Cl.
*A01N 59/20*  (2006.01)
*C01G 3/06*  (2006.01)
*C01G 3/10*  (2006.01)

(52) U.S. Cl.
CPC .............. *A01N 59/20* (2013.01); *C01G 3/06* (2013.01); *C01G 3/10* (2013.01)

(58) Field of Classification Search
None
See application file for complete search history.

(56) References Cited

U.S. PATENT DOCUMENTS

| 3,760,070 A | 9/1973 | Joice et al. |
| 5,492,681 A | 2/1996 | Pasek et al. |
| 2004/0258768 A1 | 12/2004 | Richardson et al. |

FOREIGN PATENT DOCUMENTS

| CN | 102659553 A | | 9/2012 |
| CN | 105309427 A | * | 2/2016 |
| WO | 9101942 A1 | | 2/1991 |
| WO | 1993007754 A1 | | 4/1993 |
| WO | 2017212368 A1 | | 12/2017 |

OTHER PUBLICATIONS

Anonymous; "Using copper sprays to control diseases in citrus"; Agriculture NSW, Department of Primary Industries NSW Government Primefact 757 Second Edition, available online at https://www.dpi.nsw.gov.au/_data/assets/pdf_file/0003/138171/Copper-primefact-170615-final.pdf [retrieved Jun. 4, 2019]; 2017; 5 pages.
International Search Report and Written Opinion for International Application PCT/IB2019/052123; International Filing Date: Mar. 15, 2019; Date of Mailing: Jun. 12, 2019; 17 pages.

* cited by examiner

*Primary Examiner* — Alton N Pryor
(74) *Attorney, Agent, or Firm* — CANTOR COLBURN LLP

(57) ABSTRACT

The present invention relates to a process for preparation of copper fungicide compounds. More particularly, the present invention relates to a continuous process for production of tribasic copper sulphate (TBCS).

12 Claims, 3 Drawing Sheets

Example 2

PROCESS FOR PREPARATION OF COPPER COMPOUNDS

CROSS REFERENCE TO RELATED APPLICATIONS

This application is a National Stage application of PCT/IB2019/052123, filed Mar. 15, 2019, which claims the benefit of priority to French Patent Application No. 19/01654, filed Feb. 19, 2019, both of which are incorporated by reference in their entirety herein.

FIELD OF THE INVENTION

The present invention relates to a process for preparation of copper fungicide compounds. More particularly, the present invention relates to a continuous process for production of tribasic copper sulphate (TBCS).

BACKGROUND OF THE INVENTION

Tribasic copper sulphate (TBCS, represented as formula $Cu_4(OH)_6SO_4$) is a well-known copper fungicide which has a variety of uses including, without limitation, to control bacterial and fungal diseases of fruit, vegetable, nut, and field crops and used as a protective fungicide.

A process for production of copper compounds disclosed in WO91/01942 comprises the step of contacting metallic copper with oxygen or an oxygen containing gas, and an aqueous solution consisting essentially of water in solution in which, to a concentration up to the limit of solubility thereof, is a soluble ammonium salt, together with ammonia in an amount such that initially said solution is alkaline, whereby as a result of said contact said metallic copper is initially dissolved to form a copper amine said amine formation proceeding until the saturation concentration of said amine is reached, where after said ammine continuously breaks down to form the water insoluble tribasic salt.

This process is performed in the reactor equipped with an agitator with high speed and a high velocity (minimum tip speed of 500 meter/minute). A grid separates copper and the agitated suspension. In this process all the steps of the process are carried out in the same reactor/vessel and use of high-speed stirrer creates difficulty to add copper during the reaction. This process requires high consumption of electric energy.

There exists a need to develop a simple, cost-effective and commercially viable process for the large scale preparation of copper compounds. In an effort to meet this requirement the present invention provides an industrially viable and cost-effective process for the large-scale preparation of copper fungicide compounds, preferably selected from copper oxide, copper oxychloride, copper acetate, copper carbonate, copper hydroxide, copper naphthenate, copper oleate, copper silicate and tribasic copper sulphate. This process avoids the use of complicated and expensive methods. The present invention particularly provides industrially viable large-scale preparation of copper compound such as TBCS. The present invention also provides a formulation comprising the copper compound prepared according the process of the present invention, kit comprising said copper compound optionally at least one more fungicide and a method of using the same.

SUMMARY OF THE INVENTION

In an aspect the present invention provides a simple and economical process for production of copper compound or copper fungicide. This process is easily scalable at commercial scale.

In another aspect the present invention provides a process for preparing copper fungicides, said process comprising reducing the pH of a copper fungicide precursor in the absence of metallic copper.

In another aspect the present invention provides a process for preparing a copper fungicide, said process comprising:
  a) reacting metallic copper with a tetraamine copper complex to form a diamine copper complex;
  b) oxidizing the diamine copper complex to form the copper fungicide precursor; and
  c) modifying the pH of copper fungicide precursor in the absence of copper to form the copper fungicide.

In another aspect the present invention provides commercial process for production of copper compounds comprising performing the reaction steps for copper attack and pH modification separately.

In another aspect the present invention provides a method for preparing a copper fungicide, said method comprising reducing the pH of copper fungicide precursor complex suspension using a pH modifier.

In another aspect the present invention provides a continuous process for preparing a copper fungicidal compound comprising reacting metallic copper with a tetraamine copper complex to form diamine copper complex in a first vessel; oxidizing the copper diamine complex to obtain the copper fungicide precursor as a copper tetraamine complex; continuously extracting the copper fungicide precursor from a suspension of the copper tetraamine complex and modifying the pH using suitable pH modifier in second reactor.

In another aspect the present invention provides a fungicidal formulation comprising:
  (a) at least one copper fungicide prepared by the process comprising modifying the pH of a copper fungicide precursor in the absence of copper; and
  (b) at least an agrochemically acceptable excipient.

In yet another aspect the present invention provides a process for preparing a fungicidal formulation, said process comprising:
  a) preparing a copper fungicide by a process comprising modifying the pH of a copper fungicide precursor in the absence of copper; and
  b) admixing the prepared copper fungicide with at least one agrochemically acceptable excipient to prepare the fungicidal formulation.

In another aspect the present invention provides a process for preparing a fungicidal formulation, said process comprising:
  a) preparing a copper fungicide by a process comprising modifying the pH of a copper fungicide precursor in the absence of copper;
  b) adding at least another agrochemical to the copper fungicide; and
  c) adding at least one agrochemically acceptable excipient to prepare the fungicidal formulation.

In another aspect the present invention provides a kit comprising a fungicidal formulation, said formulation comprising at least one copper fungicide prepared by the process comprising modifying the pH of a copper fungicide precursor in the absence of copper and at least an agrochemically acceptable excipient.

In another aspect the present invention provides a kit comprising at least one copper fungicide selected from copper oxide, copper oxychloride, copper acetate, copper carbonate, copper hydroxide, copper naphthenate, copper oleate, copper silicate and tribasic copper sulphate produced by the process as described herein.

DETAILED DESCRIPTION OF THE INVENTION

Figure 1:
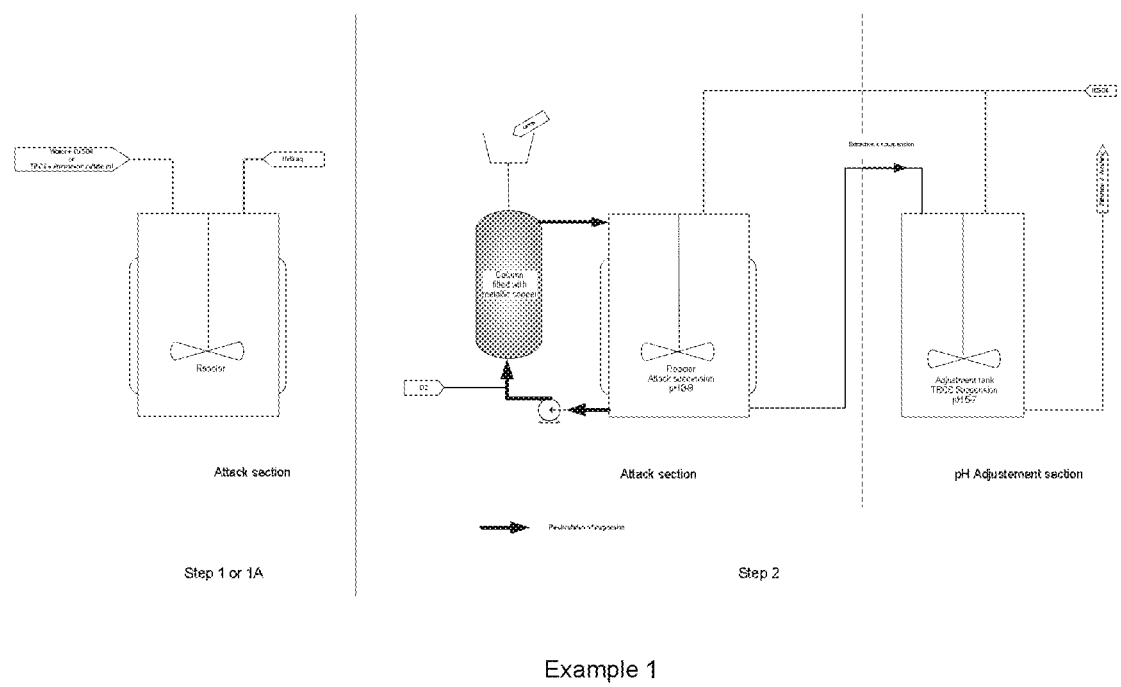
FIG. 1 is a process flow diagram according to one embodiment of the present invention.

These and other features, aspects and advantages of the present invention may be further understood and/or illustrated when the following detailed description is considered along with the attached drawing.

For the purposes of the following detailed description, it is to be understood that the invention may assume various alternative variations and step sequences, except where expressly specified to the contrary. Moreover, other than in any operating examples, or where otherwise indicated, all numbers expressing, for example, quantities of materials/ingredients used in the specification are to be understood as being modified in all instances by the term "about".

Thus, before describing the present invention in detail, it is to be understood that this invention is not limited to particularly exemplified systems or process parameters that may of course, vary. It is noted that, unless otherwise stated, all percentages given in this specification and appended claims refer to percentages by weight of the total composition. It is also to be understood that the terminology used herein is for the purpose of describing particular embodiments of the invention only, and is not intended to limit the scope of the invention in any manner. The use of examples anywhere in this specification including examples of any terms discussed herein is illustrative only, and in no way limits the scope and meaning of the invention or of any exemplified term. Likewise, the invention is not limited to various embodiments given in this specification. Unless otherwise defined, all technical and scientific terms used herein have the same meaning as commonly understood by one of ordinary skill in the art to which this invention pertains. In the case of conflict, the present document, including definitions will control.

It must be noted that, as used in this specification, the singular forms "a," "an" and "the" include plural referents unless the content clearly dictates otherwise. The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.

As used herein, the terms "comprising" "including," "having," "containing," "involving," and the like are to be understood to be open-ended, i.e., to mean including but not limited to.

As used herein, the term "reactor" is defined as an apparatus used to carry out a chemical reaction.

As used herein, the term "vessel" or "column" is any walled means in which a fluid is contained and conveyed.

The present invention provides a simple, cost effective and industrially viable process for the preparation of copper compounds or copper fungicides.

Therefore, in an aspect, the present invention provides a process for the preparation of a copper fungicide, said process comprising modifying the pH of a copper fungicide precursor in the absence of copper.

In an embodiment, modifying the pH of the copper fungicide precursor comprises reducing the pH of said copper fungicide precursor in the presence of a neutralizing agent.

In an embodiment, the copper fungicide is copper oxide and the copper fungicide precursor is tetramine copper complex.

In an embodiment, modification of the pH of a copper fungicide precursor in the absence of copper is carried out in the absence of a neutralizing agent.

In an embodiment, the copper fungicide precursor is copper sulfate.

In an embodiment, the process is carried out in the presence of a base.

In an embodiment, the copper fungicide is copper oxychloride, the copper fungicide precursor is tetraamine copper complex and the neutralizing agent is hydrochloric acid.

In an embodiment, the copper fungicide is copper acetate, the copper fungicide precursor is copper oxide, copper sulfate or copper carbonate and the neutralizing agent is acetic acid.

In an embodiment, the copper fungicide is copper carbonate and neutralizing agent is carbonic acid or carbon dioxide.

In an embodiment, the copper fungicide is copper hydroxide and the neutralizing agent is water in excess.

In an embodiment, the copper fungicide is copper naphthenate and the neutralizing agent is naphthenic acid.

In an embodiment, the copper fungicide is copper oleate and the neutralizing agent is oleic acid.

In an embodiment, the copper fungicide is copper silicate and the neutralizing agent is silicic acid.

In an embodiment, the copper fungicide is tribasic copper sulfate, the copper fungicide precursor is tetraamine copper complex and the neutralizing agent is sulfuric acid.

In an embodiment, the process is carried out in the absence of copper by being carried out in a reaction vessel made of a material other than copper.

In an embodiment, the tetraamine copper complex is prepared by reacting diamine copper complex with oxygen.

In an embodiment, the step of preparing tetraamine copper complex is carried out in a copper vessel.

In an embodiment, the steps of preparing the copper fungicide and the tetraamine copper complex are carried out separately.

In an embodiment, the diamine copper complex is prepared by reacting tetraamine copper complex with copper.

In an embodiment, the step of preparing the diamine copper complex is carried out in a copper vessel.

In an embodiment, the process step of preparing the copper fungicide is carried out separately from the process steps of preparing the tetraamine copper complex or from the process step of preparing the diamine copper complex.

In an embodiment, the process step of preparing the tetraamine copper complex and the process step of preparing the diamine copper complex are carried out in the same vessel. In an embodiment, the vessel is a copper vessel.

In an embodiment, the reaction vessel is a copper-based column reactor.

In an embodiment, the process comprises injecting the starting tetraamine copper complex at the bottom portion of the column reactor.

In an embodiment, the process comprises introducing oxygen at the bottom portion of the column reactor.

In an embodiment, any one or all the process steps are carried out in a solution of ammonium sulfate.

In an embodiment, the present invention provides a process for preparing a copper fungicide, said process comprising:
(a) preparing a diamine copper complex by reacting tetraamine copper complex with copper;
(b) reacting the diamine copper complex with oxygen to form the tetraamine copper complex; and
(c) modifying the pH of the tetraamine copper complex of step (b) in the absence of copper to form the copper fungicide.

In an embodiment, the steps (a) and (b) are carried out together in a copper vessel.

In an embodiment, the step (c) is carried out separately in the absence of metallic copper.

In an embodiment, modifying the pH of the tetraamine copper complex comprises reducing the pH of the tetraamine copper complex solution in the presence of a neutralizing agent.

In an embodiment, the step (c) is carried out in the absence of copper by being carried out in a reaction vessel made of a material other than copper.

In an embodiment, the copper fungicide is tribasic copper sulfate and the neutralizing agent is sulfuric acid.

In another aspect, the present invention provides a process for production of copper fungicide selected from copper oxide, copper oxychloride, copper acetate, copper carbonate, copper hydroxide, copper naphthenate, copper oleate, copper silicate and tribasic copper sulphate comprising modifying the pH of a copper fungicide precursor in the absence of copper.

In another aspect, the present invention provides commercial process for production of copper fungicidal compounds, said process comprising performing the steps of preparation of copper fungicide precursor and pH modification separately.

In an embodiment the present invention provides a process for production of copper fungicide, said process comprising performing reaction of copper with a copper complex and oxidation in the single vessel.

In another embodiment the copper fungicide is copper oxide and the copper fungicide precursor is tetramine copper complex and the process is carried out in the absence of a neutralizing agent.

In another embodiment the copper fungicide is copper hydroxide and the copper fungicide precursor is tetramine copper complex and the process is carried out in the absence of a neutralizing agent.

In an embodiment the copper fungicide is copper oxychloride, the copper fungicide precursor is tetraamine copper complex and the neutralizing agent is hydrochloric acid.

In an embodiment the copper fungicide is copper acetate, the copper fungicide precursor is copper oxide or copper carbonate and the neutralizing agent is acetic acid.

In an embodiment the copper fungicide is copper carbonate and neutralizing agent is carbonic acid or carbon dioxide.

In an embodiment the copper fungicide is copper naphthenate and the neutralizing agent is naphthenic acid.

In an embodiment the copper fungicide is copper oleate and the neutralizing agent is oleic acid.

In an embodiment the copper fungicide is copper silicate and the neutralizing agent is silicic acid.

In an embodiment, the present invention provides a process for production of copper fungicide comprising reducing the pH of a copper fungicide precursor with a suitable pH modifier.

In another aspect, modifying the pH of the copper complex comprises reducing the pH of the suspension containing copper fungicide precursor using suitable pH modifier to obtain desired copper compound.

In an embodiment, the pH modification of the copper fungicide precursor is carried out in the absence of copper by being carried out in a reaction vessel made of a material other than copper.

In an aspect, the present invention provides a process for preparing a copper fungicide comprising:
a) reacting metallic copper with a copper tetraamine complex to obtain copper diamine complex;
b) oxidizing the copper diamine complex to obtain a copper fungicide precursor; and
c) modifying the pH of copper fungicide precursor in the absence of copper to form the copper fungicide.

In an embodiment the step of modifying the pH is carried out separately.

In an embodiment the copper fungicide is tribasic copper sulfate (TBCS).

In an embodiment the copper fungicide precursor is tetraamine copper complex.

In an aspect the present invention provides a process for preparing tribasic copper sulphate.

In an embodiment the process for preparing tribasic copper sulphate comprises:
a) treating tetraamine copper complex with metallic copper to obtain diamine copper complex;
b) oxidizing the diamine copper complex to form the tetraamine copper complex; and
c) modifying the pH of the tetraamine copper complex to obtain tribasic copper sulphate.

In an embodiment the steps a) and b) of the process is carried out in a vessel in presence of copper.

In an embodiment tetraamine copper complex obtained in step b) is the copper fungicide precursor.

In an embodiment the step c) of modifying the pH is carried out in the absence of copper. The step (c) is carried out in the absence of copper by being carried out in a reaction vessel made of a material other than copper.

In an embodiment modifying the pH of the tetraamine copper complex comprises reducing the pH of the tetraamine copper complex solution in the presence of a neutralizing agent.

In an embodiment the pH of copper fungicide precursor is reduced upto 7 or lower but not less than 5 to obtain tribasic copper sulphate.

In an embodiment, the preparation of the tribasic copper sulfate fungicide was triggered by reducing pH, although the tribasic copper sulfate fungicide is generated while recirculating the copper fungicide precursor at pH 8-9. In this embodiment, the reduction of pH of the copper fungicide precursor to pH between 5-7 is the trigger applied to the extracted suspension from the first reactor. This trigger leads to the generation of tribasic copper sulfate at a maintained pH between 8.0-9.0.

In an embodiment, where other copper fungicides are desired, the reduced pH of the copper fungicide may be maintained between 5.0-10.0, preferably between a pH of 7.0-10.0.

Therefore, in an embodiment, the pH of the copper fungicide precursor is maintained between 8 to 9.

In an embodiment the process comprises preparation of tribasic copper sulphate separately from the process steps of preparing the diamine copper complex and copper fungicide precursor.

In an embodiment the reaction for preparing diamine copper complex and copper fungicide precursor is performed in a vessel which contains copper metal in any form for example flakes, wires, shots and such like or the vessel is copper vessel.

In an embodiment the preparation of the tetraamine copper complex and diamine copper complex is carried in the same vessel at temperature in the range of about 10-100° C., preferably about 25-75 and more preferably about 40-60° C.

The vessel contains copper metal or the reaction vessel is copper filled column reactor.

In an embodiment the process is carried out at temperature 50° C.

In an embodiment the process of preparing tribasic copper sulphate comprises formation of copper complexes namely diamine copper complex and tetraamine copper complex and converting tetraamine copper complex into TBCS.

In another embodiment the present invention provides a process for conversion of copper fungicide precursor to TBCS comprising reducing the pH of copper fungicide precursor using suitable pH modifier.

In an embodiment the copper fungicide is tribasic copper sulfate, the copper fungicide precursor is tetraamine copper complex and the pH modifier is acid.

In an embodiment the copper fungicide is tribasic copper sulfate (TBCS), the copper fungicide precursor is tetraamine copper complex and the pH modifier is sulfuric acid.

In an embodiment the process step of preparing the copper fungicide is carried out separately from the process steps of preparing the tetraamine copper complex or from the process step of preparing the diamine copper complex.

According to the present invention the copper fungicide selected from copper oxide, copper oxychloride, copper acetate, copper carbonate, copper hydroxide, copper naphthenate, copper oleate, copper silicate and tribasic copper sulphate is produced by the process as described herein.

In another aspect the present invention provides a commercial process for preparing tribasic copper sulphate (TBCS) comprising steps of (1) subjecting tetraamine copper complex to copper attack to form diamine copper complex; (2) oxidation of diamine copper complex and (3) modifying pH of a copper complex thus obtained using acid in the absence of copper to obtain TBCS.

In an embodiment the first step of the process of preparing tribasic copper sulphate comprises subjecting tetraamine copper complex to copper attack in a vessel containing copper to form diamine copper complex and oxidizing diamine copper complex in the same vessel to obtain tetraamine copper complex. In an embodiment, this tetraamine copper complex is the copper fungicide precursor when the target fungicide is tribasic copper sulfate.

In an embodiment the second step of the process of preparing tribasic copper sulphate comprises modifying pH of tetraamine copper complex in the absence of copper.

In an embodiment any one or all the process steps are carried out in a closed reaction system preferably in presence of ammonium sulfate and at temperature preferably in the range of about 40-60° C. The pressure inside the reactor is maintained between about 0.1 and 0.4 bar.

In an embodiment, the reactor system in which the process of the present invention is carried out can include at least three reaction vessels. The first reactor is fed with a suspension containing tetraamine copper complex, TBCS and ammonium sulphate. The total copper content in the suspension is in the range of 0.1 to 20%. In the first reactor the pH is maintained between 7 and 10 with a suitable pH modifier preferably with sulfuric acid to form TBCS. The second vessel is fed with metallic copper for copper attack. The second vessel is provided with inlet for supplying the suspension of first reactor and an inlet for oxygen and an outlet for the return of the suspension in the first reactor. The diamine copper complex reacts with oxygen in the second vessel to form tetraamine copper complex. Partially extracting tetraamine copper complex from the third reactor and modifying the pH using suitable pH modifier preferably with sulfuric acid leads to the formation of TBCS.

Typically, the reaction of copper attack is represented as below,

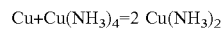

The oxidation of the diamine copper complex is represented as below.

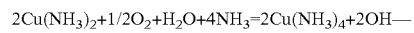

The above reactions are carried out at temperature in the range of about 45-55° C., preferably at 50° C. and pH is maintained between 8 to 9.

These reactions are performed in presence of ammonium sulfate solution.

Typically, the concentration of ammonium sulfate is in the range from 4 to 5%.

In a further embodiment, the pH modification step of the process is carried out at temperature in the range of about 45-55° C., preferably at temperature of about 50° C. and pH is maintained between 5-9, preferably between 8-9. The suspension from the neutralization step returns to the reactor for copper attack when the pH is modified. According to one embodiment of the present invention, the process for preparation of TBCS, is as represented by flow diagram in FIG. 1.

In another aspect the present invention provides a continuous process for production desired copper compounds preferably TBCS wherein copper attack of tetraamine copper complex and oxidation reaction are carried in one vessel and modification of the pH of copper complex is carried out in separate reactor preferably in the absence of copper; and the reaction product is separated continuously from the reactor and recirculating the remaining suspension to continue the reaction of copper attack to obtain desired copper compound.

In an embodiment, the reaction cycle in the process continues till the metallic copper and oxygen are present.

In one preferred embodiment, the present invention provides a continuous process for preparation of TBCS, said process comprising:
  (a) forming a suspension of TBCS, ammonium sulphate and tetraamine copper complex in a first reactor and maintaining pH of the suspension between 8-9;
  (b) injecting the suspension of first reactor to the second vessel containing metallic copper for copper attack to form diamine copper complex;
  (c) supplying oxygen in the second vessel for oxidation of diamine copper complex to form tetraamine copper complex; and (d) returning the suspension from the outlet of the second vessel to the first reactor maintaining pH between 8-9 in the presence of sulfuric acid to form TBCS;

(e) continuously extracting suspension of TBCS, ammonium sulphate and tetraamine copper complex from the first reactor to the third reactor;

(f) continuously feeding diluted ammonium sulphate to the first reactor;

(g) neutralizing the extracted suspension of step 5 using sulfuric acid to obtain TBCS; and (h) Filtering and washing the product.

Preferably in step 7 the conversion of copper tetraamine complex into TBCS is performed in by reducing the pH in the range of about 5-9.

The mother liquor obtained in step 8 is fed to the first reactor containing ammonium sulphate and the process flows as to continuously produce TBCS.

Figure 2:
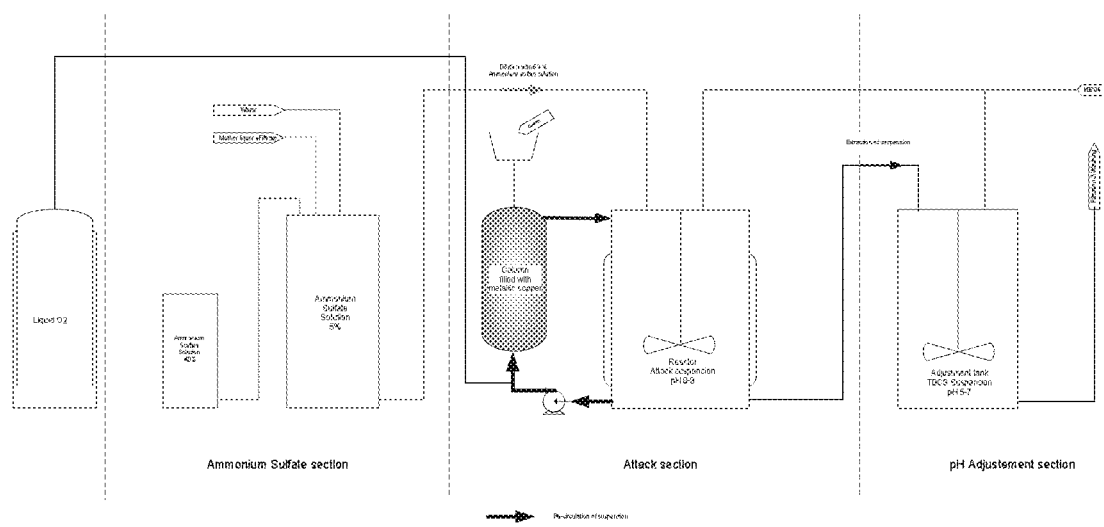
FIG. 2 is a general design of the continuous reaction system for producing TBCS according to one aspect of the present invention.
Figure 3:
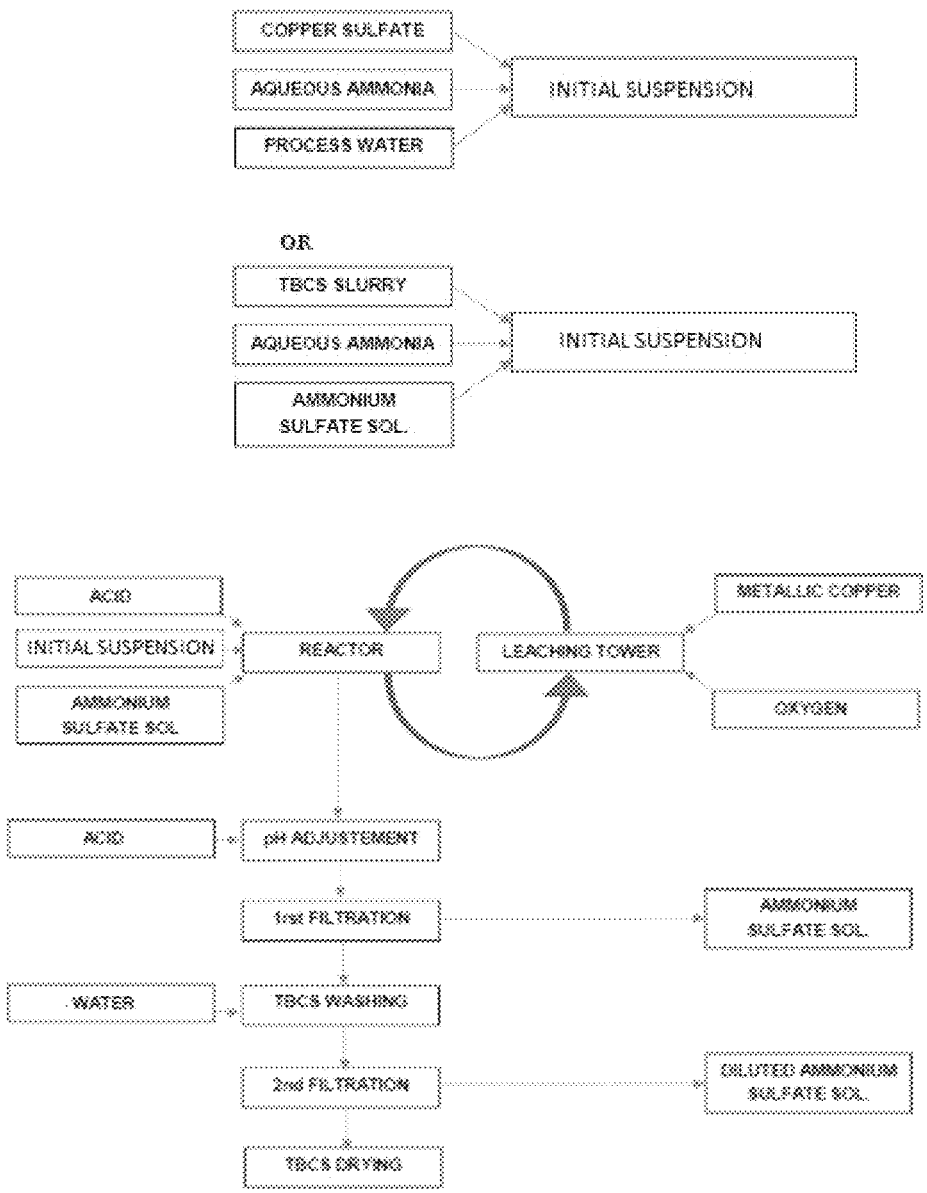
FIG. 3 is a flow chart of the process according to one aspect of the present invention.

During the continuous process the copper content in the suspension increases. A constant dilution is carried out by addition of ammonium sulfate solution to keep the copper content constant. In addition, the same volume of suspension is extracted to keep the volume constant. Typical concentration of solid TBCS in the suspension is about 10% expressed in copper. According to one embodiment of the present invention, the continuous process for preparation of TBCS, is as represented by flow diagram in FIG. 2.

In an embodiment, the copper fungicide produced by the present process is having a D50 particle size between about 3-20 microns.

In an embodiment, the TBCS is having a D50 particle size between about 3-20 microns.

In an embodiment, the copper fungicide produced by the present process is having a D50 particle size between about 5-15 microns.

In an embodiment, the copper fungicide produced by the present process is having a D50 particle size between about 8-15 microns.

In an embodiment, the copper fungicide produced by the present process is having a D50 particle size less than about 6 microns.

In an embodiment, the copper fungicide produced by the present process is having a D80 particle size less than about 6 microns.

In an embodiment, the copper fungicide produced by the present process is having a D80 particle size less than about 10 microns.

In an embodiment, the copper fungicide produced by the present process is having a D85 particle size less than about 10 microns.

In an embodiment, the copper fungicide produced by the present process is having a D90 particle size less than about 10 microns.

In an embodiment, the copper fungicide is TBCS.

In an aspect, the present invention provides a fungicidal formulation comprising:
(a) at least one copper fungicide prepared by a process comprising modifying the pH of a copper fungicide precursor in the absence of copper; and
(b) at least an agrochemically acceptable excipient.

In an embodiment the fungicidal formulation comprises at least another agrochemical.

In an embodiment the fungicidal formulation comprises at least a second fungicide.

In an embodiment the present invention provides a formulation comprising TBCS prepared by the process of the present invention.

In an embodiment the present invention provides SC (suspension concentrate), CS (capsule suspension), SE (suspo-emulsion) or WG (water-dispersible granule), ZC (mixed formulation of CS and SC) type fungicidal formulations dispersible in water and stable during storage wherein said formulation comprises a copper fungicide prepared by the process as described herein.

In an embodiment, the formulation is ZC (mixed formulation of CS and SC) fungicidal formulations.

In an embodiment, the formulation is WG (water-dispersible granule).

Typically, the process for preparation of fungicidal formulation comprises steps of fluidization, grinding, formulation with dispersing/wetting agents, inert ingredients.

In an embodiment the formulations can be in the form of concentrated suspension or wettable granules (spray drying).

In an embodiment, the present invention provides a process for preparing a fungicidal formulation, said process comprising:
(a) preparing a copper fungicide by a process comprising modifying the pH of a copper fungicide precursor in the absence of copper; and
(b) admixing the prepared copper fungicide with at least one agrochemically acceptable excipient to prepare the fungicidal formulation.

In another embodiment, the present invention provides a process for preparing a fungicidal formulation, said process comprising:
(a) preparing a copper fungicide by a process comprising modifying the pH of a copper fungicide precursor in the absence of copper;
(b) adding at least another agrochemical to the copper fungicide prepared in step (a); and
(c) admixing the prepared copper fungicide with at least one agrochemically acceptable excipient to prepare the fungicidal formulation.

In an embodiment, the second agrochemical is a fungicide.

In an embodiment the fungicidal formulation comprises a second fungicide selected from:
(a) at least one multisite fungicide selected from:
(i) elemental sulfur;
(ii) dithiocarbamate fungicides selected from amobam, asomate, azithiram, carbamorph, cufraneb, cuprobam, disulfiram, ferbam, metam, nabam, tecoram, thiram, urbacide, ziram, dazomet, etem, milneb, mancopper, mancozeb, maneb, metiram, polycarbamate, propineb and zineb;
(iii) phthalimide fungicides selected from folpet, captan and captafol;
(iv) chlorothalonil;
(v) sulfamide fungicides selected from dichlofluanid and tolylfluanid;
(vi) guanidine fungicides selected from dodine, guazantine and iminoctaadine;
(vii) anilazine;
(viii) dithianon; and
(ix) combinations thereof;
or;
(b) at least one systemic fungicide selected from:
(i) a quinone outside inhibitor selected from fenamidone, famoxadone, and a strobilurin fungicide selected from the group consisting of azoxystrobin, mandestrobin, coumoxystrobin, enoxastrobin, flufenoxystrobin, pyraoxystrobin, dimoxystrobin, enestrobin, fluoxastrobin, kresoximmethyl, metominostrobin, orysastrobin, picoxystrobin, pyrametostrobin, triclopyricarb, fenaminstrobin, pyraclostrobin and trifloxystrobin;

(ii) quinone inside inhibitor selected from cyazofamid and amisulbrom;

(iii) demethylation inhibitor selected from triflumizole, triforine, pyridinitrile, pyrifenox, fenarimol, nuarimol, triarimol and a conazole fungicide selected from the group consisting of climbazole, clotrimazole, imazalil, oxpoconazole, prochloraz, prochloraz-manganese, triflumizole, azaconazole, bitertanol, bromuconazole, cyproconazole, diclobutrazol, difenoconazole, diniconazole, diniconazole-M, epoxiconazole, etaconazole, fenbuconazole, fluotrimazole, fluquinconazole, flusilazole, flutriafol, furconazole, furconazole-cis, hexaconazole, imibenconazole, ipconazole, metconazole, myclobutanil, pencoconazole, propiconazole, prothioconazole, quinconazole, simeconazole, tebuconazole, tetraconazole, triadimefon, triadimenol, triticonazole, uniconazole, perfurazoate and uniconazole-P;

(iv) succinate dehydrogenase inhibitor selected from the group consisting of benodanil, flutolanil, mepronil, fluopyram, fenfuram, carboxin, oxycarboxin, thifluzamide, bixafen, fluxapyroxad, furametpyr, isopyrazam, penflufen, penthiopyrad, sedaxane and boscalid; and (v) combinations thereof.

In an embodiment the formulation comprises at least a third fungicide.

In an embodiment the systemic fungicide is a combination of (i) a strobilurin fungicide selected from trifloxystrobin, picoxystrobin, azoxystrobin or pyraclostrobin; and (ii) a conazole fungicide selected from prothioconazole, tebuconazole, cyproconazole, epoxiconazole, metconazole and tebuconazole.

In an embodiment, there is provided a method of controlling fungi at a locus, said method comprising administering the fungicidal formulation prepared according to the present invention to said locus.

In another embodiment, there is provided a kit comprising at least one copper fungicide selected from copper oxide, copper oxychloride, copper acetate, copper carbonate, copper hydroxide, copper naphthenate, copper oleate, copper silicate and tribasic copper sulphate produced according to the process of the present invention.

Advantages of the present invention:

1. This process is economically and commercially viable and useful for reducing the electrical consumption.
2. This process has improved reliability and stability avoiding the deposition of copper salts on metallic copper surface.
3. It avoids risk to have a direct contact between blades of the stirrer and metallic copper. The metallic copper can be added in the column readily.
4. This process can be used for production of various copper compounds for example CuO, Cu2(OH)3Cl or Cu(OH)2.

The following examples are provided to better illustrate the claimed invention and are not to be interpreted in any way as limiting the scope of the invention. One skilled in the art may develop equivalent materials, and methods without the exercise of inventive capacity and without departing from the scope of invention. It is the intention of the inventors that such variations are included within the scope of the invention.

EXAMPLES

Example 1

Formation of Triamine Copper Complex as Copper Fungicide Precursor

Step 1:

[A] Preparation of the Initial Suspension Containing Tetraamine Copper Complex, TBCS and Ammonium Sulphate Water (70 kg) was charged in a reactor. The temperature is increased to 50° C. and copper sulfate (7.0 kg) was added. The pH was increased to 8.2 with of aqueous ammonia (32%, 3.0 Kg). The final copper soluble content determined on the filtrate is 0.5% and the ammonium sulfate concentration is 4.5%. The total copper content in the suspension was 2.3%. All % are expressed in m/m.

[B] Preparation of the Initial Suspension Containing Tetraamine Copper Complex, TBCS and Ammonium Sulphate Alternatively, an initial suspension was prepared without using copper sulfate. This preparation was operated when neutral suspension obtained in the example 2 was available. Ammonium sulfate solution (80 kg) at 4.7% was charged in the reactor. Neutral suspension (4.44 kg) was added to the reactor and the temperature was increased to 50° C. The pH is increased to 8.2 with of aqueous ammonia (32%, 0.59 Kg). The final copper soluble content determined on the filtrate is 0.3% and the ammonium sulfate concentration was 5.6%. The total copper content in the obtained suspension was 0.6%.

Step 2:

The suspension obtained in part [A] and/or [B] of step 1 was charged in the reactor and recirculation of the suspension was started through à 83 millimeters column charged with copper wires (27.14 Kg). As the recirculation operates, the O2 introduction at the bottom of the column was started. The pH of the suspension in the reactor was maintained between 8 and 8.2. The pH regulation was adapted to keep the soluble copper tetramine copper concentration in the filtrate between 0.3 and 0.6% (expressed in copper). The temperature was maintained at about 50° C. for about 2 hours. The increase of the total copper content in the reactor was presented in the next table.

| t0 | % Total copper | % soluble copper (measured on filtrate) |
| --- | --- | --- |
| T0 | 2.30 | 0.50 |
| T0 + 15 mn | 3.73 | 0.52 |
| T0 + 55 mn | 6.90 | 0.48 |
| T0 + 92 mn | 9.30 | 0.45 |
| T0 + 106 mn | 9.52 | 0.44 |

Step 3:

When the total copper content in the suspension reached about 10%, the suspension was diluted with ammonium sulfate solution (5%) and the extraction of the suspension from the reactor were started. The control pH was maintained as in step 2. The reaction was operated for 2 hours at 50° C. The following table shows % of copper present in the reactor during continuous process.

| t0 | % Total copper | % soluble copper (measured on filtrate) |
|---|---|---|
| T0 | 10.2 | 0.45 |
| T0 + 51 mn | 10.0 | 0.53 |
| T0 + 110 mn | 9.63 | 0.57 |

The following table shows % of copper in the extracted suspension.

| t0 | % Total copper | % soluble copper (measured on filtrate) | Mass extracted (kg) |
|---|---|---|---|
| Sample 1 | 9.63 | 0.54 | 50 |
| Sample 2 | 9.10 | 0.45 | 15 |

Example 2

Formation of Copper Fungicide, Tribasic Copper Sulphate

The reactor equipped with a stirrer and a pH measurement was charged with 79 Kg of suspension extracted from continuous process of step 3 of example 1. 0.59 liter of sulfuric acid (98%) was added to the reactor at 50° C. maintaining the pH of the suspension containing tetraamine copper complex between 5 to 7 to form TBCS.

The complete conversion in the suspensions before and after neutralization is represented in below table.

|  | Before Neutral | After Neutral |
|---|---|---|
| % Cu total | 10 | 10 |
| % tetraamine copper complex | 0.5 | 0 |
| pH | 8-9 | 5-7 |

After the neutralization, the suspension was filtered to obtain 41.3 kg of paste. 33 kg of water were added to wash the paste, the mixture was stirred and filtered to get TBCS having copper content-53.6% which was dried in a drying oven at temperature 55° C. The filtrates obtained after the second filtration can be added in the ammonium sulfate solution and mixed with the suspension of the reactor in step 3 of example 1 to produce copper fungicide precursor and continue the process.

Example 3

Formulation (WG 40% Copper)

Step 1: Preparation of a Fluidized Paste from Washed Paste

In a tank equipped with a stirrer, 35.8 Kg of washed paste obtained in example 2, 1.25 Kg of sodium polynaphtalenesulfphonate and 1.88 kg of water was charged. The mixture was stirred and after stirring, a fluidized paste was obtained which can be used for the manufacture of formulations of WG type. The analyses of the fluidized paste are the following:

Dried matter: 56.2%
Copper content: 28.5%
Particle size (D50%): 8 μm

Step 2: Production of Water Dispersible TBCS Granules

In a tank equipped with a stirrer, 25.24 Kg of the fluidized paste obtained in step 1, 1.84 Kg of water, 1.44 Kg of sodium lignosulphonate, 0.40Kg of sodium xylenesulfonate, 0.09 Kg of an antifoaming agent based on silicone emulsion and 1.71 Kg of gypsum were charged. The mixture was stirred and after stirring, the suspension was wet grinded and sent into a drying tower and granules were thus obtained containing 40% of copper. The analysis of the WG formulation is the following:

Copper content: 40.3%
Suspensibility: >75%
Particle size (D50%): 2.3 μm

The invention claimed is:

1. A process for preparing a copper fungicide comprising:
   (a) reacting metallic copper with copper tetraamine complex to obtain a diamine copper complex;
   (b) reacting the diamine copper complex with oxygen to obtain a copper fungicide precursor; and
   (c) modifying the pH of the copper fungicide precursor in the absence of metallic copper to form the copper fungicide.

2. The process as claimed in claim 1, wherein step c) further comprises reducing the pH of said copper fungicide precursor in the presence of a neutralizing agent.

3. The process as claimed in claim 1, wherein said copper fungicide is tribasic copper sulfate and said copper fungicide precursor is a tetramine copper complex.

4. The process as claimed in claim 1, wherein the neutralizing agent is sulfuric acid.

5. The process as claimed in claim 1, wherein the copper fungicide is selected from copper oxide, copper oxychloride, copper acetate, copper carbonate, copper hydroxide, copper naphthenate, copper oleate, copper silicate, and tribasic copper sulphate.

6. A fungicidal formulation comprising:
   (a) an agrochemical active comprising at least one copper fungicide prepared by the process of claim 1, the copper fungicide having a particle size D50 between 3 and about 20 microns; and
   (b) at least one agrochemically acceptable excipient.

7. The formulation of claim 6, further comprising an agrochemical active.

8. The formulation of claim 6, wherein the at least one additional agrochemical active is a second fungicide.

9. The formulation as claimed in claim 8, wherein the second fungicide is selected from:
   (a) at least one multisite fungicide selected from:
      (i) elemental sulfur;
      (ii) dithiocarbamate fungicides selected from amobam, asomate, azithiram, carbamorph, cufraneb, cuprobam, disulfiram, ferbam, metam, nabam, tecoram, thiram, urbacide, ziram, dazomet, etem, milneb, mancopper, mancozeb, maneb, metiram, polycarbamate, propineb and zineb;
      (iii) phthalimide fungicides selected from folpet, captan and captafol;
      (iv) chlorothalonil;
      (v) sulfamide fungicides selected from dichlofluanid and tolylfluanid;
      (vi) guanidine fungicides selected from dodine, guazantine and iminoctaadine;

(vii) anilazine;
(viii) dithianon; and
(ix) combinations thereof;

or;
(b) at least one systemic fungicide selected from:
(i) a quinone outside inhibitor selected from fenamidone, famoxadone, and a strobilurin fungicide selected from the group consisting of azoxystrobin, mandestrobin, coumoxystrobin, enoxastrobin, flufenoxystrobin, pyraoxystrobin, dimoxystrobin, enestrobin, fluoxastrobin, kresoxim-methyl, metominostrobin, orysastrobin, picoxystrobin, pyrametostrobin, triclopyricarb, fenaminstrobin, pyraclostrobin and trifloxystrobin;
(ii) quinone inside inhibitor selected from cyazofamid and amisulbrom;
(iii) demethylation inhibitor selected from triflumizole, triforine, pyridinitrile, pyrifenox, fenarimol, nuarimol, triarimol and a conazole fungicide selected from the group consisting of climbazole, clotrimazole, imazalil, oxpoconazole, prochloraz, prochloraz-manganese, triflumizole, azaconazole, bitertanol, bromuconazole, cyproconazole, diclobutrazol, difenoconazole, diniconazole, diniconazole-M, epoxiconazole, etaconazole, fenbuconazole, fluotrimazole, fluquinconazole, flusilazole, flutriafol, furconazole, furconazole-cis, hexaconazole, imibenconazole, ipconazole, metconazole, myclobutanil, pencoconazole, propiconazole, prothioconazole, quinconazole, simeconazole, tebuconazole, tetraconazole, triadimefon, triadimenol, triticonazole, uniconazole, perfurazoate and uniconazole-P;
(iv) succinate dehydrogenase inhibitor selected from the group consisting of benodanil, flutolanil, mepronil, fluopyram, fenfuram, carboxin, oxycarboxin, thifluzamide, bixafen, fluxapyroxad, furametpyr, isopyrazam, penflufen, penthiopyrad, sedaxane and boscalid; and
(v) combinations thereof.

10. The fungicidal formulation of claim 8, further comprising a third fungicide.

11. The fungicidal formulation of claim 9, wherein the systemic fungicide is a combination of (i) a strobilurin fungicide selected from trifloxystrobin, picoxystrobin, azoxystrobin and pyraclostrobin; and (ii) a conazole fungicide selected from prothioconazole, tebuconazole, cyproconazole, epoxiconazole, metconazole and tebuconazole.

12. A method of controlling fungi at a locus, said method comprising administering the fungicidal formulation of claim 6 to said locus.

* * * * *